United States Patent

Carrie et al.

[11] Patent Number: 5,962,062
[45] Date of Patent: Oct. 5, 1999

[54] DIETETICALLY BALANCED MILK PRODUCT

[75] Inventors: Anne-Lise Carrie, Vevey; Edward Fern, Blonay; Mathilde Fleith, La Tour-de-Peilz; Armand Malnoe, Dommartin; Martin Vikas, Konolfingen, all of Switzerland

[73] Assignee: Nestec S.A., Vevey, Switzerland

[21] Appl. No.: 08/884,366

[22] Filed: Jun. 27, 1997

[30] Foreign Application Priority Data

Jun. 27, 1996 [EP] European Pat. Off. ............. 96201794

[51] Int. Cl.⁶ ...................................... A23C 9/00
[52] U.S. Cl. ............... 426/585; 426/72; 426/74; 426/580; 426/601; 426/800; 426/801
[58] Field of Search .................... 426/580, 581, 426/583, 584, 585, 586, 587, 588, 601, 34, 613, 800, 801, 72, 73, 74

[56] References Cited

U.S. PATENT DOCUMENTS

| 4,670,285 | 6/1987 | Clarndinin et al. ................. 426/602 |
| 5,200,226 | 4/1993 | Sanchez ............................. 426/525 |
| 5,578,334 | 11/1996 | Sundram et al. ................... 426/601 |

FOREIGN PATENT DOCUMENTS

| 0187575 | 7/1986 | European Pat. Off. . |
| 0404058 | 12/1990 | European Pat. Off. . |
| 1108395 | 1/1956 | France . |
| 2667483 | 4/1992 | France . |
| 1353096 | 5/1974 | United Kingdom . |
| 2154121 | 9/1985 | United Kingdom . |
| 2273234 | 6/1994 | United Kingdom . |

OTHER PUBLICATIONS

Derwent Database Abstract, WPI Accession No. 92–177138/199222, XRAM Accession No. C92–081173.
Derwent Database Abstract, WPI Accession No. 91–001137/1991/01, XRAM Accession No. C91–000465.
Patent Abstracts of Japan, vol. 7, No. 34, 1983.
Derwent Database Abstract, WPI Accession No. 86–2197461/198634, XRAM Accession No. C91–000465.

*Primary Examiner*—Leslie Wong
*Attorney, Agent, or Firm*—Vogt & O'Donnell, LLP

[57] ABSTRACT

A milk having a formulated lipid composition wherein the lipids are lipids of lactic and vegetable origin which are, by weight, (i) from 30% to 40% milk fat lipids, (ii) from 30% to 40% of a first oil substance which have an oleic acid content in an amount greater than 60%, and (iii) from 1% to 30% of oil substance which provide n-3 and n-6 polyunsaturated fatty acids and so that triglyceride fatty acids of the lipids comprise 20% to 40% saturated fatty acids of lactic origin, 35% to 60% monounsaturated fatty acids, and 15% to 30% of n-3 and n-6 polyunsaturated in a ratio of n-6 to n-3 fatty acids of from 5:1 to 10:1.

17 Claims, No Drawings

DIETETICALLY BALANCED MILK PRODUCT

BACKGROUND OF THE INVENTION

The invention concerns a dietetically balanced milk product containing a mixture of lipids of lactic origin and of vegetable origin.

Lipids, apart from their function as a source of energy, have various roles in nutrition as a source of essential fatty acids:

as compounds indispensable to the cellular structure and to membranous functions, as precursors for eicosanoid metabolites which take part in many physiological systems such as the cardiovascular system, and as regulators for blood lipids.

The physiological response to the consumption of food lipids depends on the composition of these lipids in fatty acids. Fatty acids are classified in various families, n-9, n-6 and n-3, according to their structure, namely according to the presence and position of the double bonds in the carbon chain. Each family has its own specific activity, but interactions exist between the various families during metabolism. In the case of the control of blood lipids, several criteria should be taken into account:

The input of saturated fatty acids in food should be limited by reason of their influence on the increase in cholesterol and total lipids and on the increase in the cholesterol of the low density lipoproteins (LDL) considered as one of the risk factors for cardiovascular diseases.

Monounsaturated and polyunsaturated fatty acids exert a favourable effect on blood lipids by reducing the cholesterol of the LDLs.

For polyunsaturated fatty acids, the following criteria should however be taken into account:

Polyunsaturated fatty acids should not be consumed in too great a quantity so as not to induce equally a reduction in the cholesterol of the beneficial high density lipoproteins (HDL), and so as not to increase the risks associated with the peroxidation of these fatty acids at the cellular level.

Among the polyunsaturated fatty acids, the specific effects of the fatty acids of the n-3 family, for example alpha-linolenic acid (ALA) or its derivatives, eicosapentaenoic acid (EPA) and docosahexaenoic acid (DHA), which exert a favourable effect on the blood triglycerides and reduce the risks of platelet. aggregation and hence, of thrombosis, should be distinguished.

In conjunction with the input of polyunsaturated fatty acids through food, account should be taken of competitions between fatty acids of the n-6 family and those of the n-3 family during metabolism by desaturases which determine the formation of fatty acids with $C_{20}$, precursors of biologically active eicosanoids.

Among the polyunsaturated fatty acids, physiological activities may differ according to the carbon chain length or the degree of unsaturation. Reference may be made for example to gamma-linolenic acid (GLA) with a degree of unsaturation of 3, which has a more pronounced activity on the control of blood lipids than do the other members of the n-6 family. The same is true, for example, for EPA and DHA in the n-3 series.

The food input of the polyunsaturated fatty acids must be accompanied with a sufficient input of antioxidant elements as, for example, tocopherols to prevent oxidative modifications of the LDLs which contribute to the development of atherosclerosis.

According to French Patent Application 2 667 483, a substitute is known for dairy cream aimed at patients at risk from cardiovascular disease, in which milk fats are replaced by a mixture of maize oil and coconut oil.

In U.K. Patent Application Publication No. GB 2 273 234, a liquid or powdered milk is described, designed to prevent cardiovascular risks, in which milk fats are replaced by a vegetable fat containing substantially monounsaturated fatty acids.

SUMMARY OF THE INVENTION

The object of the invention is to provide a milk product containing a lipid mixture based on a combination of milk fats and vegetable oils formulated so as to obtain an optimum balance of active substances in order to prevent unbalanced metabolic charges, in particular cardiovascular risks, and so that its organoleptic properties are close to those of milk.

The milk product according to the invention is characterized in that it contains lipids in which the fatty acids of the triglycerides comprise, by weight, 20 to 40% of saturated fatty acids of predominantly lactic origin, 35 to 60% of monounsaturated fatty acids and 15 to 30% of polyunsaturated fatty acids of the n-3 and n-6 families and in that the weight ratio of fatty acids of the n-6 family to those of the n-3 family is 5:1 to 10:1.

DETAILED DESCRIPTION OF THE INVENTION

The composition of the lipids of the milk product according to the invention takes account, not only of the activities of the essential fatty acids but also of the interaction of each essential fatty acid of the n-6 family, for example linoleic acid (LA), with its homologue of the n-3 family, for example ALA, and of the greater bioactivity of derivatives with a degree of unsaturation >2.

In addition, the lipid part contains an oil rich in oleic acid which has favourable effects on blood lipids and gives the lipid mixture good stability to oxidation and photo-oxidation, which prevents the formation of active oxygenated radicals.

The selected oils meeting this requirement are preferably rapeseed oil, canola oil (rapeseed oil low in erucic acid), olive oil and hybrid sunflower and safflower oils with a high oleic acid content, for example >60% by weight. Reference may also be made to the oleins of vegetable oils, for example palm oil, obtained by the fractionation of vegetable oils and fats by fractionation dry, with solvents or with surfactants.

The lipid part also contains oils contributing essential fatty acids of the n-6 and n-3 families in a ratio taking into account the greater reactivity of those of the n-3 family.

Oils rich in fatty acids of the n-6 family are chosen from those rich in LA, preferably containing more than 50% by weight of this acid with respect to the total fatty acids, for example sunflower oil, grapeseed oil, maize oil, wheat germ oil, safflower oil and soya oil.

As oils providing fatty acids of the n-3 family, reference may be made to those which contain ALA, for example rapeseed oil, canola oil, soya oil, linseed oil, blackcurrant seed oil and those providing EPA and DHA, e.g. oils of marine organisms.

The milk product according to the invention may also contain a minor quantity of other oils with the aim, for example, of improving its keeping properties and of introducing biologically active antioxidants to prevent peroxidation at the cellular level, for example cereal germ oil rich in vitamin E. The lipid mixture may additionally contain oils naturally rich in non-vitamin antioxidants, such as sesame oil or rice bran oil or furthermore rich in elements such as, for example, tocotrienols or gamma-oryzanol which exert favourable effects on the control of blood cholesterol.

On the basis of their respective compositions in fatty acids, the following mixtures of lipids are preferred:

| Lipid | % by weight | % by weight |
|---|---|---|
| Milk fat | 30–40 | preferably 40 |
| Canola oil, hybrid sunflower oil, hybrid safflower oil rich in oleic acid, olive oil or olein fractions and their blends | 30–40 | preferably 30–50 |
| Sunflower oil, maize oil, soya oil, grape-seed oil or safflower oil | 1–30 | preferably 20–25 |
| Linseed oil, blackcurrant seed oil Rice bran oil Sesame oil Wheat germ oil | 0–10 | |

The vegetable oils used are generally refined so that they are stable, while keeping, as far as possible, at least part of their unsaponifiables as an antioxidant.

It may additionally contain antioxidants that are liposoluble or are made liposoluble, for example a mixture of ascorbic acid or one of its esters, citric acid, lecithin, tocopherols and optionally beta-carotene.

The milk product according to the invention may be in the form of milk or of a liquid milk substitute and contain 1 to 4% of fats and preferably, approximately 2% fats which corresponds to a semi-skimmed milk, or it may correspond to a non-sweetened or evaporated condensed milk, and it preferably is enriched in calcium.

The milk product also may be enriched in vitamins, for example E, A, D, C, $B_6$, $B_{12}$, folate and trace elements, for example iron, magnesium and zinc.

The raw milk material used to make the milk product according to the invention may be comprised of whole milk, partially or totally skimmed milk, cream, anhydrous milk fats, buttermilk, whey, whey which has been demineralized to a varying extent, whey derivatives, in particular lactose, lactose hydrolysate, whey protein concentrate, protein fractions of whey, casein, casein fraction and milk protein hydrolysate, such components being possibly in the form of a powder, and the raw material employed may be prepared by standardization, namely by recombining various components of lactic origin.

Optionally, it is possible to add non-milk additives, particularly proteins and carbohydrates, vitamins, minerals, nucleotides, nucleosides, flavourings, colouring agents, amino acids and stabilizers.

The lactose content of the milk product may have been reduced while maintaining a high level of calcium, for example by microfiltration, which may be advantageous in certain cases for reducing the content of certain minerals having an effect on hypertension, for example sodium.

Finally, the milk product of the invention may be flavoured, for example by the addition of flavouring such as butter flavouring to reinforce a milk taste, and/or by addiction of fruit, cinnamon, vanilla, chocolate or coffee flavouring.

In this liquid presentation, it may have preferably been sterilized, ultra-pasteurized or pasteurized and be packaged aseptically or in a highly hygienic manner in a sterilized package.

The milk product may also be in powder form, for example spray dried, or it also may be a fermented milk or a cheese-like product, particularly of the mozzarella type.

A milk product according to the invention may be used as a raw material in the production of creams, ice cream, desserts, sauces and in general, in the production of any milk-based product.

The invention also provides a process for preparing a preceding liquid milk product characterized in that a milk-based raw material is standardized for milk fats, and that a lipid of vegetable origin is incorporated therein, optionally in the presence of an emulsifier so as to obtain an emulsion, and that the emulsion is preheated, heat treated by UHT, homogenized, cooled and aseptically packaged.

The invention also provides a process for preparing a preceding milk product in the form of powder, characterized in that a milk-based raw material is standardized for milk fats, and that a lipid of vegetable origin is incorporated in it, optionally in the presence of an emulsifier so as to obtain an emulsion, that the emulsion is preheated and then concentrated by evaporation, and that the concentrate is homogenized and then spray dried and optionally an emulsifier is added such as lecithin to make an instant product.

The invention also provides a process for preparing a preceding fermented milk product, characterized in that a milk-based raw material is standardized for milk fats, that it is pasteurized, that it is seeded with one or more thermophilic or mesophilic lactic ferments and that it is fermented until a pH of less than 5 is obtained, that a lipid of vegetable origin is incorporated in the fermented milk or in the raw material before pasteurization, that it is optionally heated and that it is packaged in packs.

The liquid raw material used in the processes of the present invention is as described previously above.

In the present invention of vegetable origin are incorporated by emulsification, preferably in the presence of lecithin at approximately 50° C. with vigorous agitation, for example in a colloid mill, and other stages of the process are carried out in a conventional manner.

EXAMPLES

The following examples illustrate the invention. In these, the percentages and parts are by weight unless indicated to the contrary.

Examples 1–7

Example 1

A whole milk containing 3.95% of fats and 8.52% of non-fat solids and a low fat milk containing 0.05% fats for 9% of non-fat solids were pasteurized separately by treating them at 87° C. for 12 s. 34.33 kg of whole milk were then mixed with 0.509 kg of powdered skimmed milk (dried at a moderate temperature) and 162.93 kg of low fat milk, cooled to 15° C., and then a premix of 1.26 kg of canola oil, 0.9 kg of maize oil, 72 g of lecithin (TOPCITHIN 200 (R)) and 1 g of vitamin E brought to 50° C. was then incorporated in this mixture by means of a colloid mill. After heating to 80° C. in a plate exchanger, the liquid was ultrapasteurized by UHT at 141° C. for 2s. After cooling to 78° C., it was homogenized in two stages, at 200 bar, then at 50 bar, and it was cooled to 40° C. and packaged in previously sterilized brick packs; homogenization, cooling and filling being carried out aseptically.

Example 2

The procedure was as in Example 1, except that as vegetable oils, 1.08 kg of canola oil, 0.72 kg of maize oil and 0.36 kg of rice bran oil were incorporated in the mixture of whole milk, low fat milk and powdered skimmed milk.

Example 3

The procedure was as in Example 1, except that as vegetable oils 1.44 kg of canola oil and 1.08 kg of maize oil were incorporated in a mixture of 25.1 kg of whole milk, 171.8 kg of low fat milk and 0.496 kg of powdered skimmed milk.

Example 4

The procedure was as in Example 1, except that as vegetable oils, 1.44 kg of canola oil, 0.72 kg of maize oil and 0.36 kg of rice bran oil were incorporated in a mixture of 25.1 kg of whole milk, 171.8 kg of low fat milk and 0.496 kg of powdered skimmed milk.

Example 5

A whole milk containing 3.92% fats and 8.58% non-fat solids and a low fat milk containing 0.05% fats and 9% of non-fat solids were pasteurized separately by treating them at 87° C. for 12 s.

34.69 kg of whole milk and 160.26 kg of low fat milk, were then mixed, cooled to 15° C., and 1.08 kg of hybrid sunflower oil with a high oleic acid content, 1.08 kg of soya oil and 1 g of vitamin E brought to 50° C. were then incorporated in this mixture by means of a colloid mill.
Sterilized product After heating to 80° C. in a plate exchanger, the liquid was sterilized by UHT at 148° C. for 5 s. After cooling to 78° C., it was homogenized in two stages, at 200 bar, then at 50 bar, was cooled to 20° C. and packaged in previously sterilized brick packs, homogenization, cooling and filling being carried out aseptically.
Pasteurized product The liquid was heated to 72° C. for 15 s in a plate exchanger, was homogenized in two stages at 200 bar, then at 50 bar, cooled to 4° C. and packaged in brick packs.

Example 6

The procedure was as in example 1 except that, as vegetable oils, 1.08 kg of hybrid sunflower oil with a high oleic acid content, 0.9 kg of sunflower oil and 0.18 kg of linseed oil were incorporated in the mixture of whole milk and standardized low fat milk.

Example 7

The procedure was as in Example 1 except that, as vegetable oils, 1.26 kg of canola oil, 0.72 kg of maize oil and 0.18 kg of blackcurrant seed oil were incorporated in the mixture of whole milk and standardized low fat milk.

The Table herein gives the percentages of saturated fatty acids (SFA), monounsaturated fatty acids (MUFA) and polyunsaturated fatty acids, and the ratios n-6/n-3 as well as the atherogenicity index (IA) and the thrombogenicity index (IT) of the lipid mixtures of the milk products of Examples 1–7.

The IA and IT values were calculated from the definitions given in Ulbricht, T.V.L and Southgate, D.A.T., The Lancet, 1991, 338: 985.

| Example | SFA (%) | MUFA (%) | PUFA (%) | n-6/n-3 | IA | IT |
| --- | --- | --- | --- | --- | --- | --- |
| 1 | 34.1 | 42.1 | 23.8 | 7.72 | 0.52 | 0.67 |
| 2 | 34.9 | 41.6 | 23.5 | 8.39 | 0.54 | 0.71 |
| 3 | 28.2 | 44.2 | 27.6 | 8.2 | 0.39 | 0.52 |
| 4 | 28.8 | 45.3 | 25.9 | 7.39 | 0.4 | 0.53 |
| 5 | 35 | 42.9 | 22.1 | 9.88 | 0.53 | 0.73 |
| 6 | 34.3 | 40.5 | 25.2 | 7.17 | 0.51 | 0.66 |
| 7 | 33.8 | 41.2 | 25 | 6.18 | 0.52 | 0.63 |

As a comparison, milk fat has high IA and IT indices, 2.03 and 2.07 respectively, according to Ulbricht, T.V.L and Southgate, D.A.T., the Lancet, 1991, 338: 985.

Example 8

Milk powders were prepared with 10–30% fats by using as the fat phase a mixture of milk fats and vegetable oil mixtures in the proportions of Examples 1–7.

After standardizing a mixture of whole milk and low fat milk, it was preheated to 80° C. in a plate exchanger and the mixture of vegetable oils was added to it in-line. After a pasteurizing heat treatment, the mixture was concentrated by evaporation to 50% dry matter, was homogenized and then spray dried under moderate conditions.

As an alternative, the vegetable oils were added after concentration.

Example 9

A fermented milk with 1–4% fats was prepared by using as the fat phase a mixture of milk fats and of a mixture of vegetable oils in the proportions of Examples 1–7.

After standardizing a mixture of whole milk and low fat milk, a premix of the vegetable oils of Examples 1–7 were incorporated in this mixture. The whole was pasteurized in a plate exchanger, the liquid was cooled to the fermentation temperature, a thermophilic or mesophilic lactic ferment was added and incubation was carried out until a pH of <5 was obtained.

As an alternative, the premix of vegetable oils was added after fermentation.

The subsequent operations of filling and sealing pots took place in a conventional manner.

Examples 10–11

Full fat and medium fat fermented and gelled milks were prepared which were enriched in probiotic bacteria and in which the fat had the following composition:

| Fat | % |
| --- | --- |
| Milk fat | 40 |
| Canola oil | 10 |
| Soybean oil | 16 |
| Hybrid sunflower oil | 24 |

-continued

| Fat | % |
|---|---|
| rich in oleic acid | |
| Olive oil | 10 |

89.3 Parts milk containing respectively 30 g/l (Example 10) and 15 g/l (Example 11) of the preceding fat were mixed with 3.7 parts of skimmed milk powder and the mixture was preheated to 70° C. and pasteurized at 92° C./6 min, and then after having been cooled to 70° C., the mixure was homogenized in one stage at 300 bar. After cooling to 43° C. the mixture was inoculated with 2% of a common yoghurt starter comprising *Streptococcus thermophilus* and *Lactobacuilus bulgaricus* and with 5% of *Lactobicillus johnsonii* (La1, CNCM I-1227). After conditioning in pots, fermentation was carried out at 38° C. up to pH 4.6 and the pots were then cooled to 6° C.

Examples 12–13

The same fat mixture as in Examples 10–11 was used for manufacturing fermented full fat and medium fat Mozzarella-like products.

In so doing 94.2 parts skimmed were mixed with 3 parts of the fat mixture (Example 12), respectively 96.6 parts skimmed milk were mixed with 1.5 part of the fat mixture (Example 13) and the mixture was preheated a: 70° C. homogenized at 50 bar and then cooled to 4° C. The day after the mixture was pasteurized at 74° C./15 s, it was inoculated with common Mozzarella starters based on *Streptococcus thermophilus,* coagulated with rennet, the curd was cut and drained in conditions of dry matter and temperature which allowed to reach the spinning point, the mass was stretched, formed into morsels, the morsels were hardened by immersion in cold water and conditioned with a liquid of composition near to that of whey into water-tight flexible pouches.

We claim:

1. A milk having a formulated lipid composition wherein the milk comprises lipids selected from the group consisting of lipids of lactic and vegetable origin wherein, by weight, the lipids are comprised of (i) from 30% to 40% milk fat, (ii) from 30% to 40% of a first oil substance which has an oleic acid content in an amount greater than 60%, and (iii) from 1% to 30% of at least one second oil substance so that the composition comprises n-3 and n-6 polyunsaturated fatty acids and so that triglyceride fatty acids of the lipids comprise
   20% to 40% saturated fatty acids of lactic origin,
   35% to 60% monounsaturated fatty acids, and
   15% to 30% of n-3 and n-6 polyunsaturated in a ratio of n-6 to n-3 fatty acids of from 5:1 to 10:1.

2. A milk according to claim 1 wherein the milk is a mixture which comprises the oil substances and whole milk.

3. A milk according to claim 1 wherein the milk is a mixture which comprises the oil substances and a mixture of whole milk and a skimmed milk.

4. A milk according to claim 1 wherein the milk is a mixture which comprises the oil substance and a mixture of whole milk and low-fat milk.

5. A milk according to claim 3 wherein the milk mixture further comprises a low-fat milk.

6. A milk according to claim 1 wherein the first oil substance is selected from the group consisting of rapeseed oil, canola oil, olive oil, hybrid sunflower oil, hybrid safflower oil and vegetable oil oleins and wherein the second oil substance is selected from the group of oils containing n-6 fatty acids consisting of sunflower oil, rapeseed oil, maize oil, wheat germ oil, safflower oil and soya oil and from the group of oils containing n-3 fatty acids consisting of rapeseed oil, canola oil, soya oil, linseed oil, blackcurrant oil and oils of marine organisms which comprise EPA and DHA.

7. A milk according to claim 1 or 6 wherein the lipids further comprise a third oil substance selected from the group consisting of rice bran oil, linseed oil, wheat germ oil and sesame oil, and the further oil is present and is in an amount of up to 10% by weight.

8. A milk according to claim 1 wherein the lipids comprise the first oil substance in an amount of from 30% to 35% and the third oil substance in an amount of from 20% to 25%.

9. A milk according to claim 1 further comprising alpha-tocopherol.

10. A milk according to claim 1 enriched in calcium.

11. A milk according to claim 1 enriched in vitamins A, $B_6$, $B_{12}$, C, D and E, enriched with folate and enriched with iron, magnesium and zinc.

12. A milk according to claim 1 further comprising a flavorant.

13. A milk according to claim 1 which is fermented.

14. A milk according to claim 1 which is pasteurized.

15. A milk according to claim 1 which is sterilized.

16. A milk according to claim 1 wherein the composition is a liquid and comprises the lipids in an amount, by weight, of from 1% to 4%.

17. A milk according to claim 1 wherein the composition is a liquid and comprises the lipids in an amount, by weight, of approximately 2%.

* * * * *